US006595346B1

(12) United States Patent
Advani et al.

(10) Patent No.: US 6,595,346 B1
(45) Date of Patent: Jul. 22, 2003

(54) DEVICE COMPRISING A NUMBER OF SUPERPOSED BUCKET CONVEYORS FOR SORTING FLAT OBJECTS

(75) Inventors: Pierre Advani, Buc (FR); Jean-Luc Astier, Mercurol (FR); Dino Selva, Maison-Alfort (FR)

(73) Assignee: Solystic, Gentilly Cedex (FR)

( * ) Notice: Subject to any disclaimer, the term of this patent is extended or adjusted under 35 U.S.C. 154(b) by 0 days.

(21) Appl. No.: 10/018,379

(22) PCT Filed: Jul. 13, 2000

(86) PCT No.: PCT/EP00/06711

§ 371 (c)(1),
(2), (4) Date: May 9, 2002

(87) PCT Pub. No.: WO01/05523

PCT Pub. Date: Jan. 25, 2001

(30) Foreign Application Priority Data

Jul. 15, 1999 (FR) .......................................... 99 09163

(51) Int. Cl.[7] ............................................ B65G 17/32

(52) U.S. Cl. ........................... 198/370.04; 198/370.05; 198/704

(58) Field of Search ...................... 198/370.04, 370.05, 198/704

(56) References Cited

U.S. PATENT DOCUMENTS

| | | | | | |
|---|---|---|---|---|---|
| 3,357,539 | A | * | 12/1967 | Naslund | 198/370.05 |
| 4,964,499 | A | * | 10/1990 | Morikiyo et al. | 198/370.04 |
| 5,353,912 | A | * | 10/1994 | Killer et al. | 198/370.04 |
| 6,068,109 | A | * | 5/2000 | Schuster | 198/704 |

* cited by examiner

*Primary Examiner*—Joseph A. Dillon
(74) *Attorney, Agent, or Firm*—Pitney, Hardin, Kipp & Szuch LLP

(57) ABSTRACT

The device for sorting flat objects comprises at least one first conveyor consisting of buckets moving along a closed loop first path and a second conveyor, mechanically independent of the first conveyor, also consisting of buckets moving in a closed loop path and vertically superposed over the first path. Movement of both conveyors are synchronized by an electric shaft. Flat objects are transferred between conveyors by gravity.

3 Claims, 1 Drawing Sheet

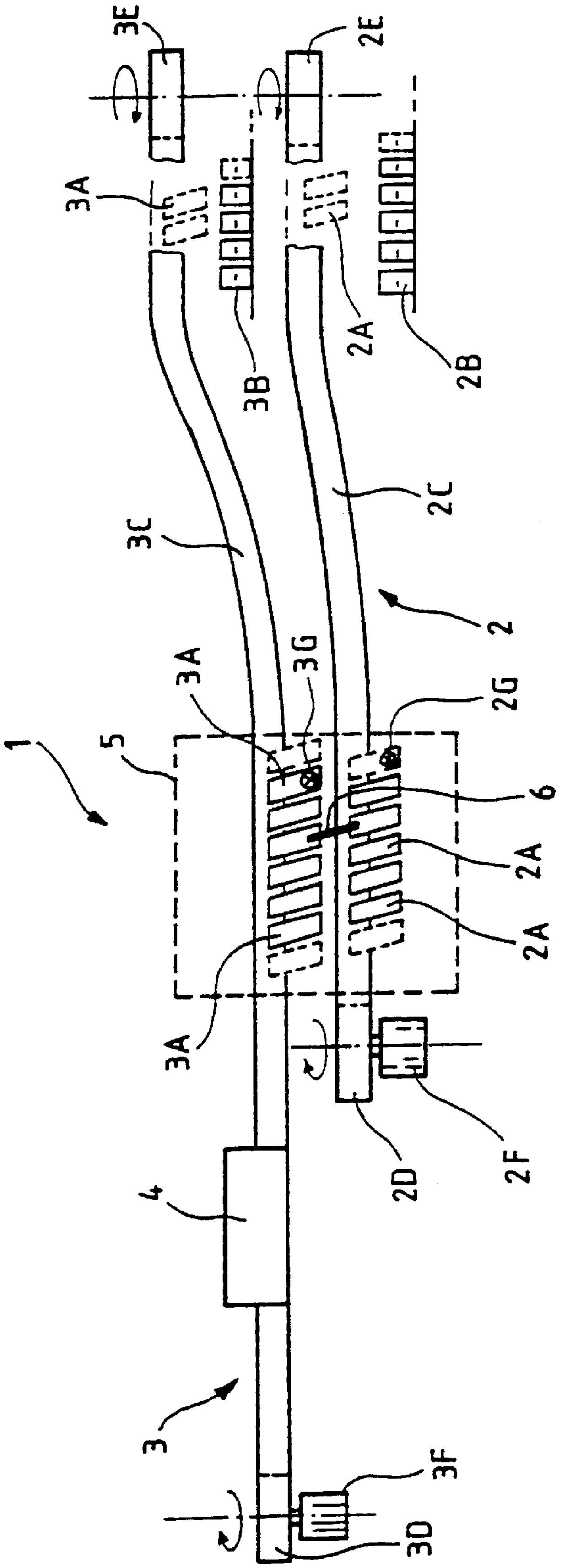
1
2
3
4
5
6
2A
2B
2C
2D
2E
2F
2G
3A
3B
3C
3D
3E
3F
3G

DEVICE COMPRISING A NUMBER OF SUPERPOSED BUCKET CONVEYORS FOR SORTING FLAT OBJECTS

The invention relates to a device for sorting flat objects comprising buckets into which the flat objects are loaded, each bucket being moved along a path above a collection of sorting outlets towards which the flat objects are removed.

The invention applies more specifically to a postal sorting machine. A postal sorting machine customarily consists of a single bucket conveyor, the buckets moving along a very long closed-loop path to serve a great many sorting outlets. To reduce the floor space occupied by such a machine, there has already been the idea of designing a number of horizontal levels on which the buckets move, these levels being connected to each other by a path portion of helical shape. However, this solution leads to problems with the tension of the chain that drives the movement of the buckets and the strains to which the chain is subjected are detrimental to the reliability of the machine. Furthermore, this solution entails very powerful conveyor drive which is expensive.

The object of the invention is to overcome this drawback.

To this end, the subject of the invention is a device for sorting flat objects comprising buckets into which the flat objects are loaded, each bucket being moved along a path above a collection of sorting outlets towards which the flat objects are removed, this device comprising at least one first conveyor consisting of buckets moving along a first path in a closed loop and a second conveyor, mechanically independent of the first conveyor, consisting of buckets moving along a second path in a closed loop superposed with the first path in a vertical direction, and being one wherein the movement of the buckets of the first conveyor along the first path and the movement of the buckets of the second conveyor along the second path are synchronized by an electric shaft and there is a zone along the two paths where the flat objects in the buckets of the second conveyor are transferred under gravity into the buckets of the first conveyor.

With this arrangement, the load that has to be motorized is lower than it is with a long conveyor, and this makes it possible to envisage a less powerful individual drive means for each conveyor. The reliability of the entire assembly is thereby improved because of the reduction in the lengths of chain, and the times taken to get the individual conveyors up to speed and the times taken to stop them can be shortened as far as possible, making it possible to improve the sorting rate.

Still other features and advantages will become apparent from reading the description which follows of one embodiment of a device according to the invention illustrated very diagrammatically in the single FIGURE.

In the FIGURE, the device 1 for sorting flat objects comprises a lower conveyor 2 consisting of buckets 2A moving along a first path in a closed loop and an upper conveyor 3 consisting of buckets 3A moving along a second path in a closed loop superposed with the first path. The two paths extend in approximately parallel respective planes.

The conveyor 2 serves first sorting outlets consisting of baskets such as 2B placed on a first horizontal level and the conveyor 3 serves second sorting outlets consisting of baskets such as 3B placed on a second horizontal level located above the first level of sorting outlets. In the figure, only a small number of buckets 2A, 3A and baskets 2B, 3B have been depicted, but it is to be understood that the total periphery of each conveyor is covered with buckets. Conveyors comprising 200 to 350 buckets are commonplace in postal sorting machines.

The buckets 2A of the conveyor 2 are fixed to a bracket 2C which is suspended in the conventional way from a structure involving running and guide rollers on a rail which forms part of the structure of the conveyor 2 and which runs alongside the first conveying path. The running and guide structure of the conveyor 2 is coupled to a drive chain passing over a drive pulley 2D driven by a motor 2F and a return pulley 2E which also tensions the chain.

The buckets 3A of the conveyor 3 are also fixed to another bracket 3C which is suspended from a structure involving running and guide rollers on another rail forming part of the conveyor 3 and running alongside the second conveying path. The running and guide structure of the conveyor 3 is coupled to another drive chain passing over a drive pulley 3D driven by a motor 3F and a return pulley 3E which also tensions the chain.

Note that the movement of the chains in the conveyors 2 and 3 is essentially rectilinear so that the chains are not subjected to significant torsion. The conveyors 2, 3 have independent drives, the power of which is designed to suit the length of chain that is to be driven.

Each bucket such as 2A, 3A may consist of three compartments each of which can contain a flat object placed edge-on in a position that is slightly inclined with respect to the vertical. Each compartment of a bucket is equipped with an opening mechanism consisting of a moving flap (not depicted) which allows the flat object to be discharged simply under gravity.

The position of each of the buckets in a conveyor is monitored and controlled by electronic tags fixed to each bucket and by cells working in conjunction with these electronic tags, for example of the inductive sensor type, distributed around the periphery of the conveyor. This type of electronic tagging makes it possible to identify each bucket in all phases of operation of the conveyor (start-up, running up to speed, stopping), getting around the problems of bucket vibration. Each conveyor 2, 3 is controlled by its own regulator to serve the sorting outlets allocated to it in an independent way. What this means is that the rate of recirculation of the flat objects (that is to say objects going round on the conveyor by more than one circuit) is relatively low. Specifically, the traffic on a bucket conveyor distributing to fewer sorting outlets is lower than on a bucket conveyor distributing to a greater number of sorting outlets.

This sorting device is supplied with flat objects from one or more local centers such as 4 which feed the flat objects only into the buckets 3A of the upper conveyor 3. If the flat objects are bound for a sorting outlet served by the lower conveyor 2, these objects are transferred from a bucket 3A of the conveyor 3 into a bucket 2A of the lower conveyor 2 across a transfer zone 5. In this transfer zone, the movement of the buckets 2A and 3A of the conveyors 2 and 3 are synchronized by an electric shaft. Under running conditions, the buckets of the two conveyors are moved along at the same constant speed. Synchronization is therefore intended to compensate for any drift of one or other conveyor so as locally to obtain perfect vertical alignment of the buckets 2A and buckets 3A so that flat objects can be transferred. This synchronization may be achieved by slaving the motors 2F and 3F on the basis of the passage of the electronic tags of the buckets 2A and 3A past determined positions where cells such as 2G and 3G are located. These cells are arranged in the transfer zone and the transfer zone 5 is placed near the motorized pulleys 2D, 3D to make the slaving as responsive as possible. As can be seen in the figure, these two pulleys 2D, 3D are placed at the same end of the device 1. In the transfer zone 5, the buckets 2A and 3A of the two conveyors follow parallel paths which are very close together in a vertical plane to allow a flat object in a bucket 3A to be transferred simply under gravity into a bucket 2A. If a flat object cannot be transferred into a bucket of the lower conveyor because this bucket is already full, the flat object is recirculated on the upper conveyor. The same is true if the two conveyors are not synchronized.

As visible in the figure, the system 4 for feeding in flat objects is located between the drive pulley 3D of the upper conveyor 3 and the transfer zone 5, which allows the feed system not to feed flat objects into buckets of the conveyor 3 which are recirculating flat objects which have not already been discharged into the sorting outlets.

The rate at which flat objects can be fed into the device according to the invention may be about 15% higher than the feed rate in a device which has the same number of buckets but in which the buckets move in just one path. The feature of having a number of levels of sorting outlets also allows a new sorting session to be begun just after the upper conveyor has been emptied of the flat objects from the previous session. What is more, the lower conveyor 2 can sort the flat objects of one session while the flat objects of the next session are in the process of being sorted in the upper conveyor 3. The layout of the device according to the invention therefore makes it possible to shorten the waiting time between two sorting sessions.

The invention extends to a device with more than two superposed conveyors, for example with three conveyors. In the case of a device with three conveyors with buckets superposed in the vertical direction, it is necessary to provide a transfer zone with an electric shaft between the uppermost conveyor and the lowermost conveyor and another transfer zone with an electric shaft between this uppermost conveyor and the conveyor at the intermediate level, to prevent the latter from becoming overladen by the transfer of flat objects.

What is claimed is:

1. A device for sorting flat objects (6) comprising at least one first conveyor (2) consisting of buckets (2A) moving along a first path in a closed loop and a second conveyor (3), mechanically independent of the first conveyor, consisting of buckets (3A) for receiving flat objects moving along a second path in a closed loop superposed with the first path in a vertical direction, and being one wherein the movement of the buckets (2A) of the first conveyor along the first path and the movement of the buckets (3A) of the second conveyor along the second path are synchronized by an electric shaft and there is a zone (5) along the two paths where the flat objects in the buckets of the second conveyor are transferred under gravity into the buckets of the first conveyor.

2. The device as claimed in claim 1, in which the first and second conveyors (2, 3) each comprise a chain for driving the buckets, the chain being mounted on a motorized pulley (2D, 3D), in which the motorized pulley of the first conveyor and the motorized pulley of the second conveyor are placed at the same end of the device and the zone (5) for the transferring of the flat objects is near the motorized pulleys of the first and second conveyors.

3. The device as claimed in either of claims 1 and 2, in which each bucket (2A, 3A) carries an electronic tag and in which the electric shaft consists of cells (2G, 3G) operating in conjunction with the electronic tags belonging to the buckets, these cells being arranged in the transfer zone (5).

* * * * *